United States Patent [19]
Awalt

[11] 3,992,873
[45] Nov. 23, 1976

[54] LOW POWER UNIFORM HIGH LUMINOUS INTENSITY DIGITAL DISPLAY

[75] Inventor: Rockland Karl Awalt, San Jose, Calif.

[73] Assignee: International Product Development Incorporated, Palo Alto, Calif.

[22] Filed: May 19, 1975

[21] Appl. No.: 578,697

[52] U.S. Cl. .................................. 58/50 R; 340/334
[51] Int. Cl.[2] ..................... G04B 19/30; G09B 13/00
[58] Field of Search .................. 58/50 R, 85.5, 4 A, 58/58; 340/334, 336, 337

[56] References Cited

UNITED STATES PATENTS

| | | | |
|---|---|---|---|
| 3,781,852 | 12/1973 | White et al. | 340/336 |
| 3,787,752 | 1/1974 | Delay | 340/336 |

*Primary Examiner*—E. S. Jackmon
*Attorney, Agent, or Firm*—Flehr, Hohbach, Test, Albritton & Herbert

[57] ABSTRACT

A light emitting digital display for use in subminiature assemblies such as miniaturized wrist watches. A crystal controlled frequency reference operates in conjunction with integrated circuitry for providing scanning of a number of display digits and for scanning of individual segments in each digit. The digit scan frequency is above the frequency resolution capability of an observers eye and the segment scan feature allows only one segment in the entire display to be energized at any instant. The segment duty cycle is therefore on the order of the ratio of one to the total number of segments in the display, which allows high peak current to be passed through each segment while maintaining a low average current. The high peak current provides for a high luminous intensity display. A finger switch having two exposed electrodes is actuated by placing a biological segment across the electrodes thereby causing the display to appear. An associated photosensitive device provides a signal indicative of ambient light level for continuously varying the brightness of the display to afford a desired contrast to the eye of an observer. The photosensitive device is also sensitive to the brightness level of individual segments and provides a signal for instantaneous adjustment of current through each segment to provide for uniform brightness therebetween. A set switch is provided including a Hall effect device for sequencing the display to a predetermined point by placing a magnetic field proximate to the assembly while actuating the finger switch.

23 Claims, 12 Drawing Figures

LOW POWER UNIFORM HIGH LUMINOUS INTENSITY DIGITAL DISPLAY

BACKGROUND OF THE INVENTION

This invention relates to a light emitting digital display and more particularly to such a display exhibiting high efficiency and producing high uniform brightness.

Available light emitting digital displays have digit scanning features for diminishing instantaneous power drain on miniature power sources. Power drain imposed on the power source by any digit depends upon the number of segments in the digit which are energized. In the usual display there are seven segments, which when all energized represent the arabic numeral 8. The minimum number of segments energized would be two, representing the arabic numeral 1. Different power drain levels occur between these two extremes for different symbols commanded from the normal seven segment dispLay. Differing power drain levels give rise to differing light intensity emission levels from the different digits. Different ambient light levels cause different display contrast levels and subsequent variation in display readability. Available light emitting digital displays attempting to cope with the problem of differing display readability in varying ambient light levels provide only stepped levels of display brightness, generally a low brightness level for low ambient light levels and a high brightness level for high ambient light levels. Such displays are limited in the degree of miniaturization wich may be achieved by the mechanical considerations for display actuating switches and display setting or adjustment switches.

A light emitting digital display and circuit for use therewith is needed which utilizes proximity sensing solid state switching circuitry together with circuitry for reducing the power drain from the miniature power source while providing high display luminous intensity, evenness of display brightness, and continuous contrast control relative to ambient light levels.

OBJECTS AND SUMMARY OF THE INVENTION

The invention disclosed herein includes a digit array formed by the relative physical positions of a number of discreet light emitting segments for the purpose of displaying predetermined number and alphabet symbols according to selected segments which are energized. The digit array is enabled for a first period of time by means functioning at a first frequency. The first frequency is above the upper limit of frequency resolution of an observer's eye. Means are also provided for scanning the light emitting segments at a second frequency which is higher than the first frequency, wherein all segments in the digit array are scanned within the first period of time. A switch is provided for energizing the selected segments causing them to emit light. Means are provided for controlling the luminous intensity of light emitted by each selected segment energized in the array, so that they assume substantially the same luminous intensity level. The digit array thereby produces an illuminated symbol with uniform light intensity from all of the segments energized.

It is an object of the present invention to provide a light emitting digital display which reduces power supply drain while providing for increased display brightness.

It is another object of the present invention to provide a light emitting digital display in which the evenness of brightness from segment to segment in the digit array is controlled.

It is another object of the present invention to provide a light emitting digital display in which continuous control of the total display brightness is maintained relative to ambient light levels.

It is another object of the present invention to provide a light emitting digital display in which display and set switching is accomplished by electronic switching to obtain minimal switch volume.

It is another object of the present invention to provide a light emitting digital display in which the number of relatively high power digit and segment driving components are minimized.

Additional objects and features of the invention will appear from the following description in which the preferred embodiment has been set forth in detail in conjunction with the accompanying drawings.

DESCRIPTION OF THE PREFERRED EMBODIMENTS

Figure 1:
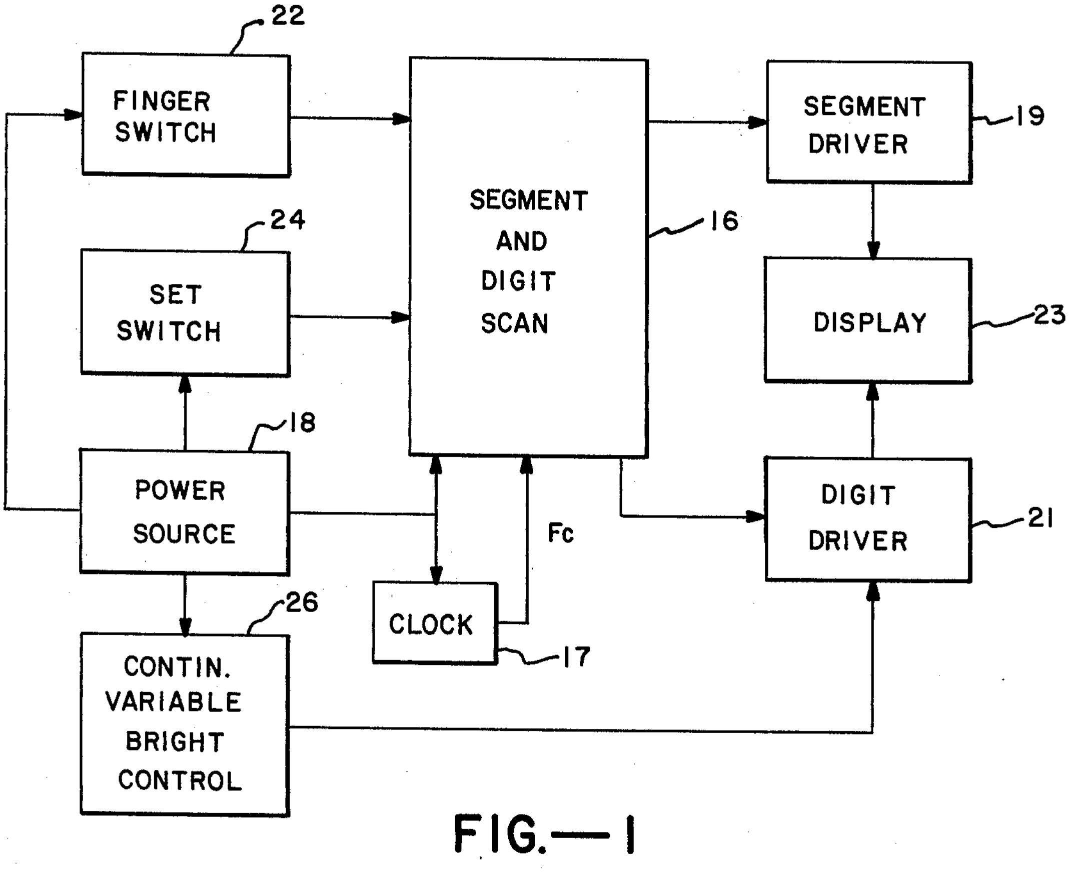
FIG. 1 is a block diagram of the light emitting digital display apparatus.

Referring to FIG. 1, a block diagram is shown of the present invention having a segment and digit scan section 16 which receives a reference frequecy $F_c$ from a clock 17. A power source 18 is also provided for energizing the various sections of the circuit. Segment and digit scan section 16 provides a scanning signal to the segment driver section 19. Scan section 16 also provides a digit scan signal for enabling a digit driver 21. A finger switch 22 is provided, powered by power source 18, and connected to scan section 16 for actuating segment driver 19. Segment driver 19 is connected to display 23 for scanning preselected segments therein contained in a preselected digit to form the display. The preselected segments and digit are predetermined within scan section 16 according to a program sequence through which scan circuit 16 advances on a time base provided by reference frequency $F_c$.

A set switch 24 is powered by power source 18 and connected to scan section 16 for setting display 23 while finger switch 22 is actuated. A continuous variable brightness control section 26 is connected to power source 18 and digit driver 21 for providing a predetermined contrast in display 23 for various levels of ambient light and for providing uniform brightness from individual segments and each digit in display 23.

Figure 2:
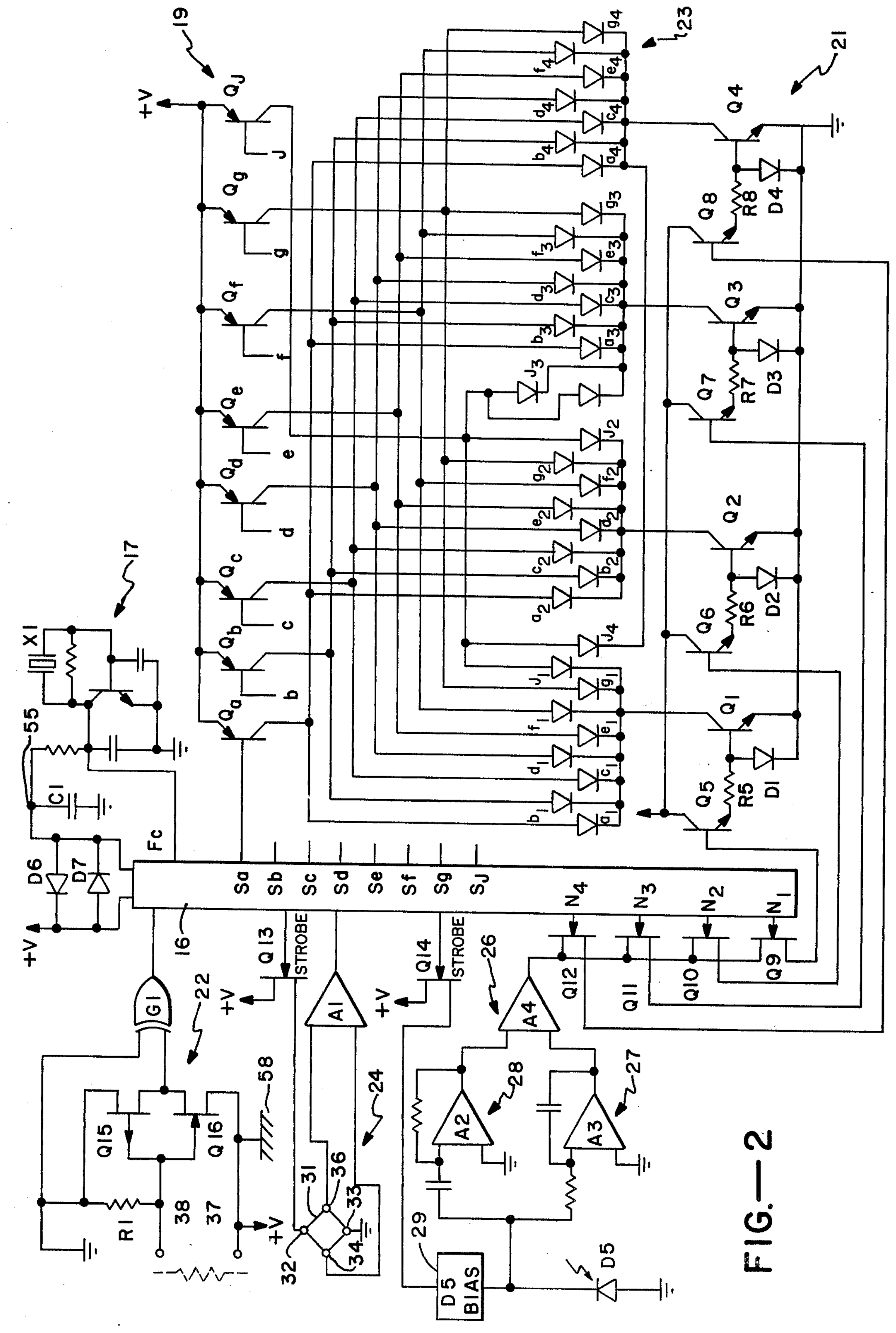
FIG. 2 is an electrical schematic of the display of FIG. 1.

FIG. 2 is a schematic diagram showing one particular circuit arrangement for obtaining the function described above of the block diagram of FIG. 1. Clock 17 is shown as an oscillator circuit containing a frequency reference crystal XI. The output frequency $F_c$ is determined by XI which is shown connected to scan section 16. Power source 18 is represented throughout the schematic by the symbol +V which is shown connected to scan section 16 in conjunction with a capacitor C1. Segment and digit scan section 16 produces a sequence of segment scan signals $S_a$ through $S_J$ at terminals thereon which are connected to the bases of transistors $Q_a$ through $Q_J$ in segment driver 19. Scan section 16 also produces a sequence of digit enabling signals $N_1$ through $N_4$ which are connected to the gates of enhancement mode field effect transistors $Q_9$ through $Q_{12}$ respectively. The drain terminal on field effect transistors (FET'S) $Q_9$ through $Q_{12}$ are connected to the bases of transistors $Q_5$ through $Q_8$ respectively contained within digit driver circuit 21. Transistors $Q_5$ through $Q_7$ function as voltage to current amplifiers for providing a predetermined current level through diodes $D_1$ through $D_4$ respectively. The anode of diodes $D_1$ through $D_4$ is connected to the base of transistors $Q_1$ through $Q_4$ respectively for providing a predetermined bias resulting from the forward voltage drop across diodes $D_1$ through $D_4$ due to the predetermined current level therethrough. In this fashion a number of "current mirrors" are formed by the combinations of diodes and transistors $D_1/Q_1$ through $D_4/Q_4$. The current mirrors each drive a digit array in display 23 as may be seen in the connections of FIG. 2.

The sources of FET'S $Q_9$ through $Q_{12}$ are connected to the output terminal of an operational amplifier $A_4$ contained within continuously variable brightness control 26. Operational amplifier $A_4$ has two inputs, one from a low pass filter represented by intergrator 27 and one from a high pass filter represented by differentiator 28. The inputs to integrator 27 and differentiator 28 are provided by photodiode $D_5$ which is exposed to both ambient light and light emitted from display 23. Photodiode $D_5$ may be any type of photosensitive device and in this embodiment has means 29 for adjusting bias for photodiode $D_5$. Bias means 29, as shown in FIG. 2 may be a constant current generator which will allow the cathode of photodiode to provide a voltage output dependent upon light intensity impinging thereon. An enhancement mode FET $Q_{14}$ is shown connected to scan section 16, in this embodiment, for connecting power to continuously variable brightness control 26 during the time finger switch 22 is actuated.

Set switch 24 is shown in this embodiment containing a Hall effect device 31 energized from power source 18 through FET $Q_{13}$, which is an enhancement mode device in this embodiment. Hall effect device 31 has a pair of control electrodes 32 and 33 and a pair of Hall electrodes 34 and 36. $Q_{13}$ is strobed "on" to place +V at control electrode 32 when finger switch 22 is actuated. When a magnetic field of sufficient strength is placed proximate to Hall effect device 31 with finger switch 22 actuated a signal appears between Hall electrodes 34 and 36 which is connected to the input terminals of an operational amplifier $A_1$. The output of amplifier $A_1$ is connected to scan section 16 for causing display 23 to step through its predetermined sequence at a rapid rate for initial setting of display 23 to provide a desired initial display.

Finger switch 22 contains a pair of actuating terminals 37 and 38 which are externally accessible. In this embodiment actuating terminal 37 is connected to +V on power source 18 which is also connected to a conducting framework for supporting the entire circuit of FIG. 2. A pair of FET'S $Q_{15}$ and $Q_{16}$ is shown having both gates connected to actuating terminal 38. $Q_{15}$ is an n type depletion mode device and $Q_{16}$ is a p type enhancement mode device. The drain of $Q_{15}$ is connected to a ground reference potential and a high value resistance $R_1$ is connected between the drain and gate of $Q_{15}$. The source of $Q_{15}$ is connected to +V on power source 18. The source drain connection from $Q_{15}$ to $Q_{16}$ respectively is connected to one input of an exclusive OR gate $G_1$. A second input to exclusive OR gate $G_1$ is connected to the ground reference potential of power source 18. Exclusive OR gate $G_1$ provides an output connected to scan section 16. Under conditions to be hereinafter described OR gate $G_1$ actuates segment and digit scanning to provide a predetermined light emission pattern from display 23.

FIG. 2 also includes a plurality of light emitting diodes (LED'S) indicated at $a_1$ through $J_1$, $a_2$ through $J_2$, $a_3$ through $J_3$ and $a_4$ through $J_4$ in display 23. In this embodiment segments $a_1$ through $g_1$ and segments $J_1$ and $J_4$ are arranged in the position of the most significant digit to provide predetermined alphebetical and numerical symbols according to predetermined combinations of selected ones of the segments which are energized. In like manner the next significant digit has arranged LED'S $a_2$ through $g_2$ and $J_2$ to provide symbols according to combinations of selected segments to be energized. The display 23 of FIG. 2 shows a time base display and therefore segment $J_3$ is positioned to provide a colon in the display. The third most significant digit in the display includes LED'S $a_3$ through $g_3$. The least significant digit in display 23 includes LED'S $a_4$ through $g_4$.

Figure 3:
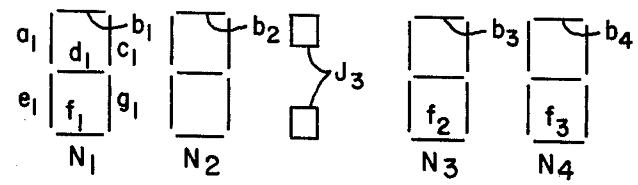
FIG. 3 shows segment orientation for the usual numeric digital display.

Before entering a description of the manner in which the embodiment of FIG. 2 operates it is deemed advisable to refer to FIG. 3 in which a usual time indicating digital display is shown. The digits are shown from the most to the least significant as in $N_1$ through $N_4$ respectively. A colon is provided between digits $N_2$ and $N_3$ by an LED providing segment designated $J_3$ as described above. The segments in digit $N_1$ are generally arranged in the seven segment pattern shown, and for purposes of this description will be designated $a_1$ through $g_1$ as labeled. Similar arrangements of relative physical position obtain for digit arrays $N_2$ through $N_4$.

Figure 4:
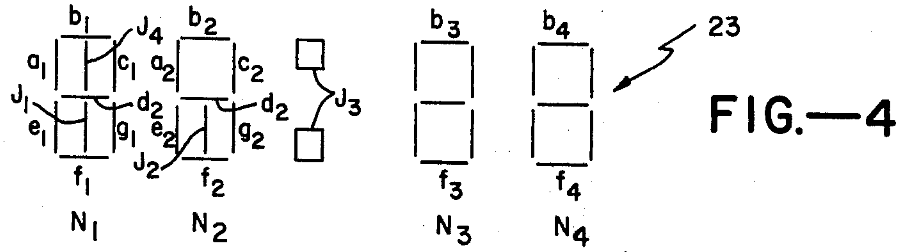
FIG. 4 shows a segment orientation for a combined numeric and letter digital display.

The digit array corresponding to the circuit embodiment of FIG. 2 is seen in FIG. 4. The digital display of FIG. 4 contains the digit arrays of $N_1$ through $N_4$ as indicated. Referring to digit array $N_1$ it may be seen that the segment designations $a_1$ through $g_1$ are physically positioned in a manner similar to that of digit array $N_1$ of FIG. 3. Additionally the digit array $N_1$ of FIG. 4 contains two segments $J_1$ and $J_4$ centrally positioned as shown. Digit array $N_2$ contains one additional segment $J_2$ centrally located in the bottom half thereof. The remainder of digital display 23 in FIG. 4 is similar to that of FIG. 3 described above.

Figure 5:
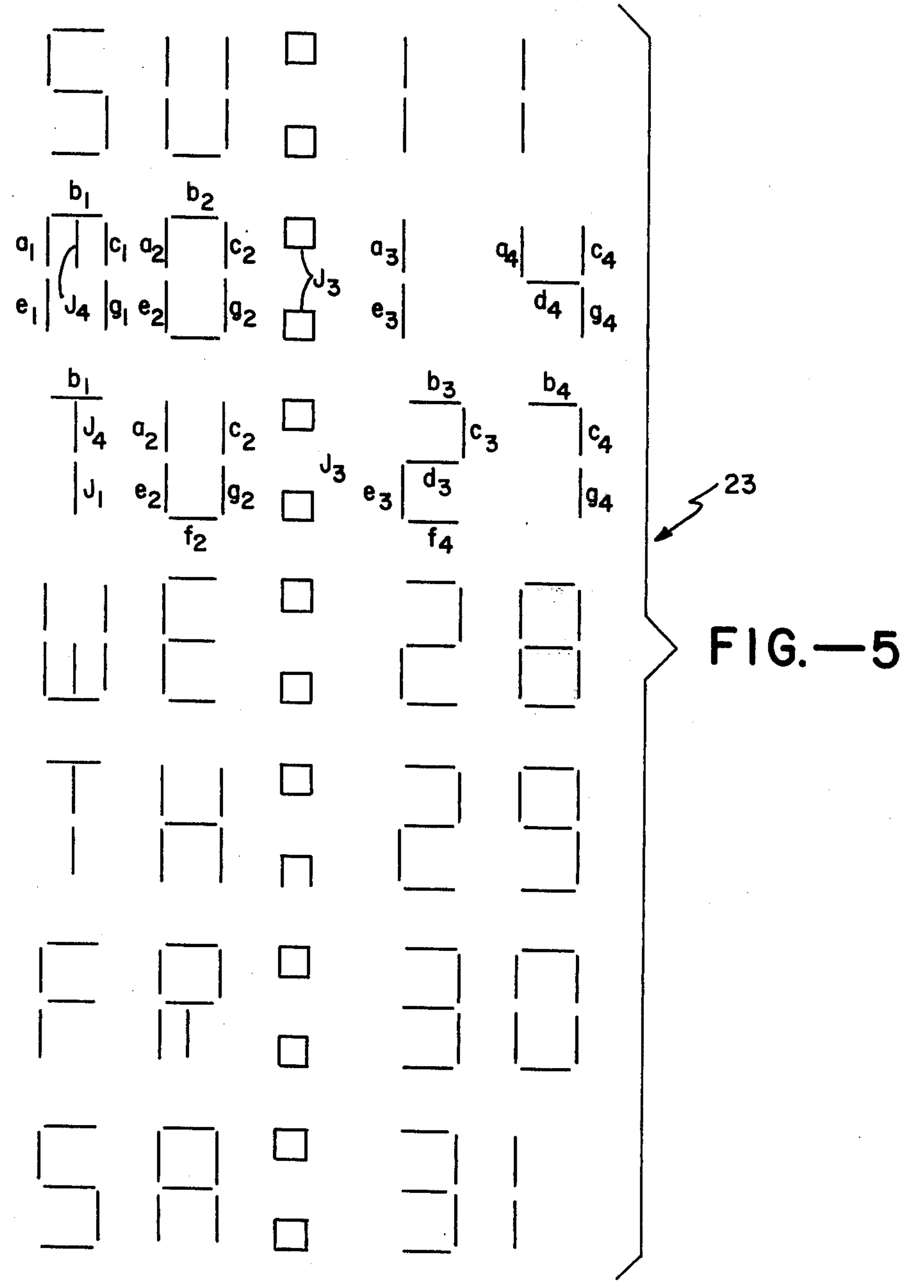
FIG. 5 shows a series of symbols which may be derived from the display of FIG. 4.

The physical positioning of segments as shown in FIG. 4 provides the possibility for displaying date of the week and month date data as shown in FIG. 5. Such a display would require an additional switch, similar to finger switch 22, for connection to scan section 16 for selecting display of such information. It may be seen that if the display is properly set initially by means of set switch 24 as described above, actuation of the proper externally accessable switch may provide an indication such as MO:14, which may indicate the day Monday, April 14, 1975 for example. FIG. 5 shows such a combination wherein the segment designations which must be selected to be energized are indicated. May 27, 1975 falls on a Tuesday, and after proper setting through means such as set switch 24 while the appropriate finger switch is actuated, a display indicating TU:27 may be obtained from display 23, as also shown in FIG. 5. Necessary segments selected for energizing to obtain the above are labeled in FIG. 5.

Figure 6:
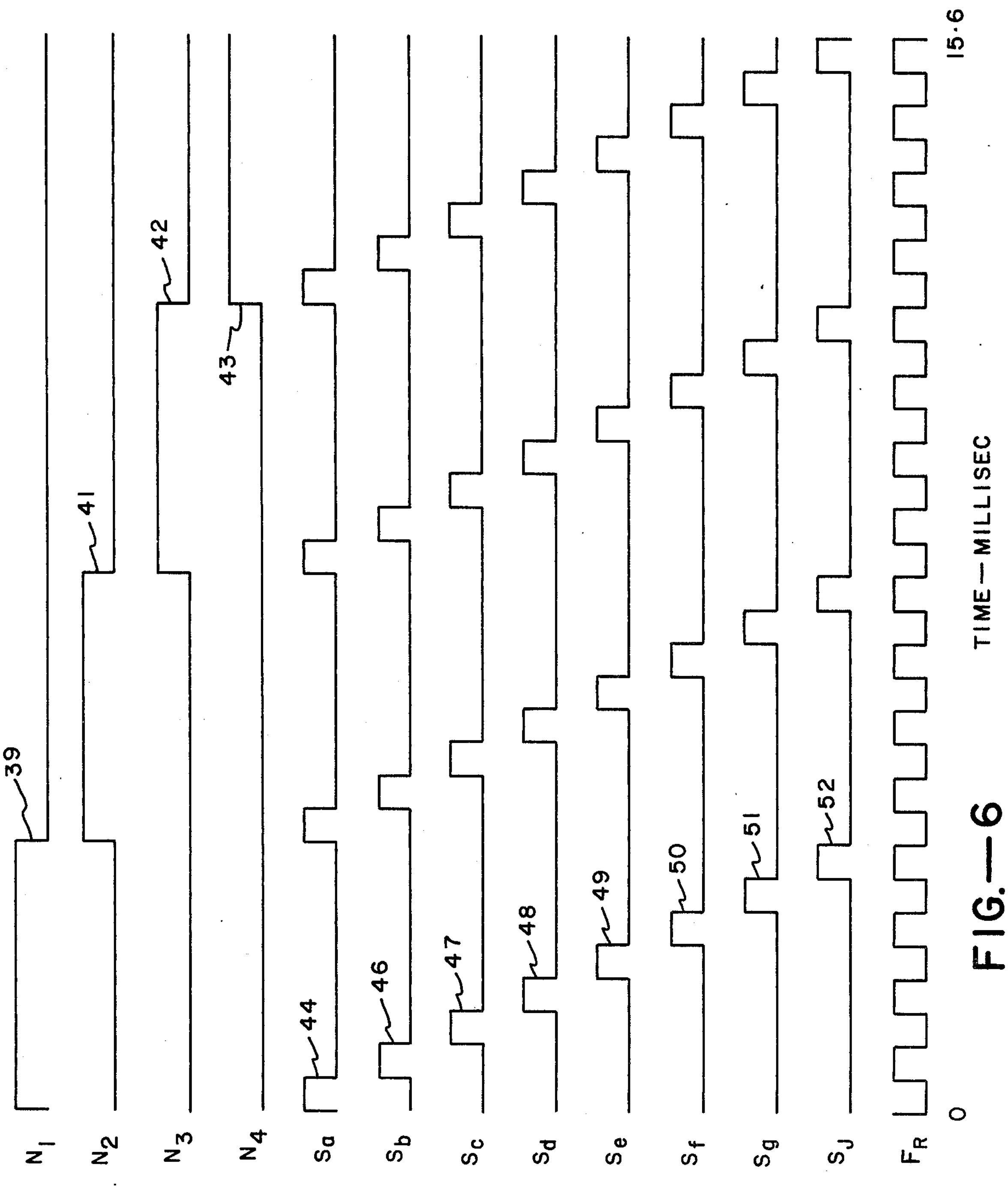
FIG. 6 is a timing chain showing relative signal phasing within the circuit of FIG. 2.

Turning now to the operation of the circuit of FIG. 2 reference is made to FIG. 6. The clock frequency $F_c$ is divided by conventional means within scan section 16 to provide a reference frequency $F_R$ as shown in FIG. 6. Reference frequency $F_R$ has a value of 1024 HERTZ for this embodiment. The remainder of FIG. 6 shows a full digit and segment scanning cycle with all digit and segment scan signals present. It is not material whether digit scan signals are termed enabling signals or segment scan signals are termed enabling signals. For the purposes of this decription digit scan signals will be described as enabling signals existing in sequence at terminals $N_1$ through $N_4$ of scan section 16 and segment scan signals will exist at terminals $S_a$ through $S_J$ when finger switch 22 is in the actuated condition.

FIG. 6 shows a pulse 39 present at terminal $N_1$ which has a dwell time equivalent to four periods of the reference frequency $F_R$. Pulse 39 has a frequency of repetition which is 1/16 of the frequency $F_R$. When pulse 39 dwell time terminates pulse 41 is presented at terminal $N_2$. Pulse 41 has a dwell time and repetition frequency similar to pulse 39. Upon termination of pulse 41, pulse 42 occurs having a dwell time and repetition frequency similar to pulse 39. Upon termination of pulse 42, pulse 43 occurs having a dwell time and repetition frequency similar to pulse 39. In this fashion each digit array may be enabled sequentially at a digit scan frequency for a predetermined period.

The digit enabling pulses 39, 41, 42 and 43 are presented at the gates of enhancement mode FET'S $Q_9$ through $Q_{12}$ respectively. The output from continuously variable brightness control circuit 26 is thereby applied to the bases of transistors $Q_5$ through $Q_8$ in sequence for the dwell times of the digit pulses to thereby enable their respective current mirrors for those respective periods as may be seen by the circuit of FIG. 2. The digit scan frequency is higher than the visual frequency resolution of an observer's eye, so there will be no flicker observed in the illuminted display 23.

A segment scan frequency is also produced by scan section 16 having a value of ¼ of $F_R$ in this embodiment. If all segments of all digits were to be eneregized in sequence the signals appearing at terminals $S_a$ through $S_J$ would appear as indicated in FIG. 6. A pulse 44 at terminal $S_a$, having a dwell time of ½ the period of $F_R$ in this embodiment, appears at a segment scan frequency of ¼ $F_R$. Similar pulses 46 through 52 appear in sequence at terminals $S_b$ through $S_J$ at the segment scan frequency. It may be seen that the segment scan pulses have a period such that they may all exist within the period of the digit scan pulse. In this fashion each segment is scanned while each digit is enabled.

Circuitry within scan section 16 receives clock frequency $F_c$ for providing a continuous stepping through predetermined segments for each digit to provide the display desired. In the instance of the display of FIG. 4 utilizing the circuit of FIG. 2, the stepping proceeds so as to produce numerals 0 through 9 by the proper combination of segments in digit $N_4$ at the rate of one step per second. In the same manner digit $N_3$ proceeds in step-wise fashion from 0 through 6 repetitively, through the proper selection of segments at the rate of one step each ten seconds. The selected segments to be energized at any particular point in time after initial setting, are only energized upon actuation of finger switch 22. When switch 22 is actuated the predetermined pulses among those shown at terminals $S_a$ through $S_J$ are connected to the bases of transistors $Q_a$ through $Q_J$ respectively during the dwell time period of pulse 39 for all pulse 44 through 52 which are present. In this fashion respective segments $a_1$ through $J_1$ are energized. A complete path from +V through the selected transistor in segment driver 19, through the selected segment, and through transistor $Q_1$ in digit driver 21 to ground potential is provided. The segments are scanned once again during the period of pulse 41, during the period of pulse 42, and during the period of pulse 43. All digits are thus scanned in sequence and all segments are scanned in each digit in sequence for energizing selected segments therein during each period of the digit scanning frequency.

From the above it may be seen that only one segment in the entire display 23 is energized at any one instant. This important feature provides considerable advantage. In the instance where the digital display circuit disclosed herein is used in a subminiature assembly such as a wrist watch, the power source 18 is in the form of a subminiature battery. It has been found that a single cell lithium battery is compatable in size with such a wrist watch assembly, and will deliver approximately 3.7 volts DC terminal voltage. Therefore, higher peak current levels are potentially available than could be provided by a pair of ordinary 1.5 volt DC batteries in series connection which are required to energize a plurality of segments.

A further advantage derived from the segment multiplexing is seen from the reduced duty cycle for each segment. Normally four digits are multiplexed in digital display watches using light emitting devices in which the cathodes of the light emitting devices are common in a given digit. As may be seen by reference to FIG. 7, when digits only are multiplexed and all selected segments in each digit are energized simultaneously a terminal voltage drop represented by line 53 may occur for a display 12:39. If, for simplification, the current level through each segment is presumed to drop the terminal voltage by one graduation on the vertical scale seen in FIG. 7 for each segment energized, then reference to FIG. 3 and 4 will demonstrate the validity of terminal voltage 53 as 2, 5, 6 and 6 segments are energized respectively in digits $N_1$ through $N_4$. Each segment may be seen to be subjected to a 25% duty cycle. If an 8 milliamp peak current is passed through each segment then the average segment current is 2 milliamps.

Figure 7:
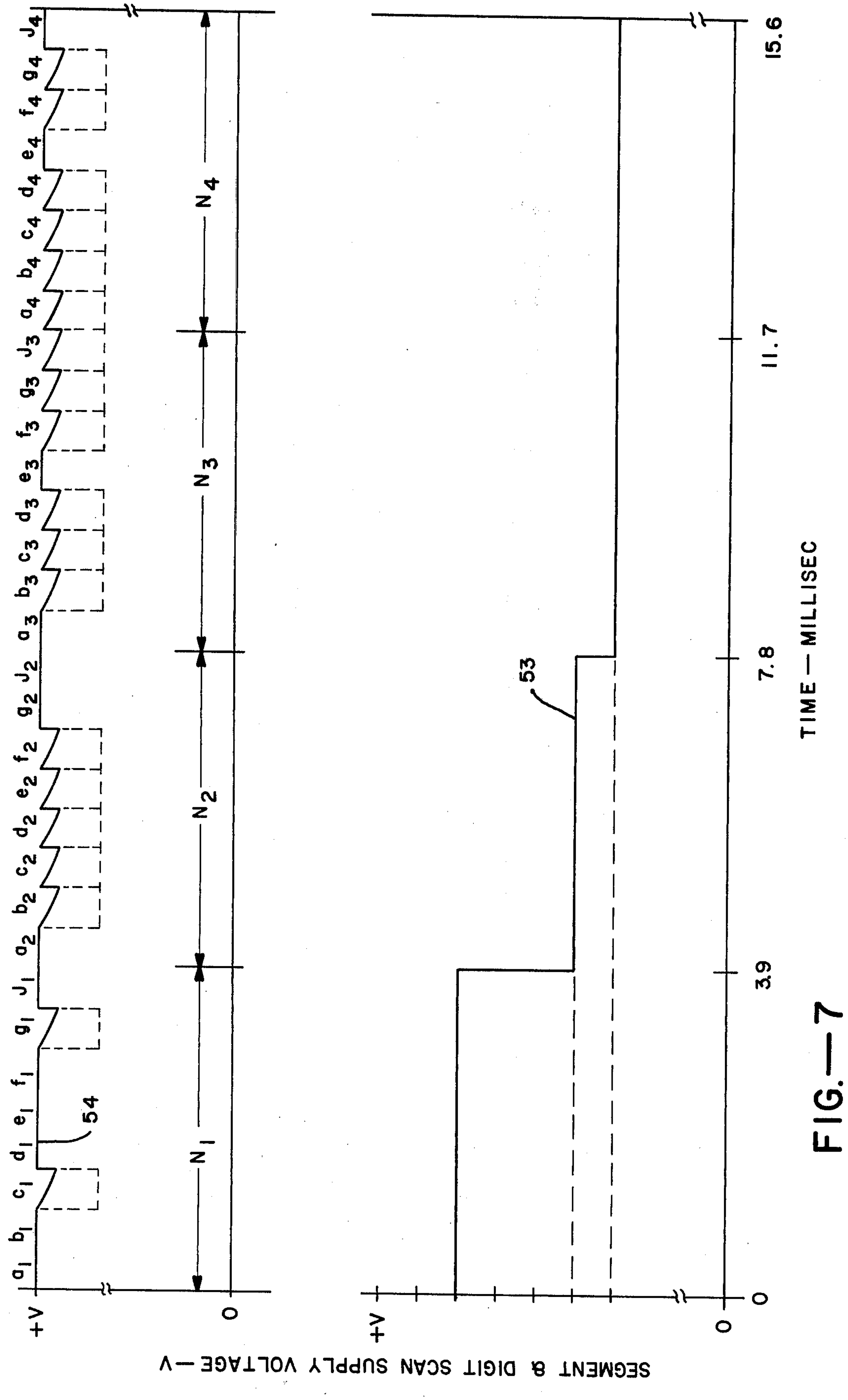
FIG. 7 shows the comparison of power supply terminal voltage for the disclosed invention and circuits old in the art.

In the instant invention with segment multiplexing for the same combination of numbers at display 23 as described above, a terminal voltage variation 54 is seen in FIG. 7. Only one segment is energized at any one time, and assuming similar circuit parameters as for the case where segment multiplexing is not utilized, the terminal voltage will drop to some level below +V determined by the current level through a selected segment. The presence of capacitor $C_1$ across the terminals of power source 18 provides for the saw tooth shape of terminal voltage 54 at point 55 as energy stored in capacitor $C_1$ is provided to the circuit during the period of the segment scan pulse. Capacitor $C_1$ in conjunction with diodes D6 and D7 also provides for continuous high level power which is connected to the circuit 16 and oscillator 17 during instantaneous disconnection of power source 18 from the circuit, and for prevention of a temporary low state of power at point 55 during digit drive, which could cause clock 17 to stop. It has been found that capacitor $C_1$ will maintain the circuit in operating condition even while power source 18 in the form of a battery is removed from the circuit for replacement. This presumes finger switch 22 is not actuated during the period while the battery is being removed and replaced so that a quiescent current level only is drawn by the circuit.

Further observation of FIG. 7 reveals that the segment scanning which results in terminal voltage 54, also results in a 3.125% duty cycle for the segments in this embodiment. It may therefore be seen that a 64 milliamp peak square wave current may be provided for each segment while still maintaining the 2 milliamp average current obtained in the circuit without segment scanning described above. Since the duty cycle of the segment when segment scanning is utilized is only ⅛ that of a segment where digit scanning alone is utilized, the peak current level through the scanned segments may be eight times the peak current through the unscanned segments while maintaining the same average current level. Conversely, peak current with segment scanning may be some intermediate multiple of the unscanned value, thereby producing greater luminous intensity together with conservation of power source energy.

Figure 10:
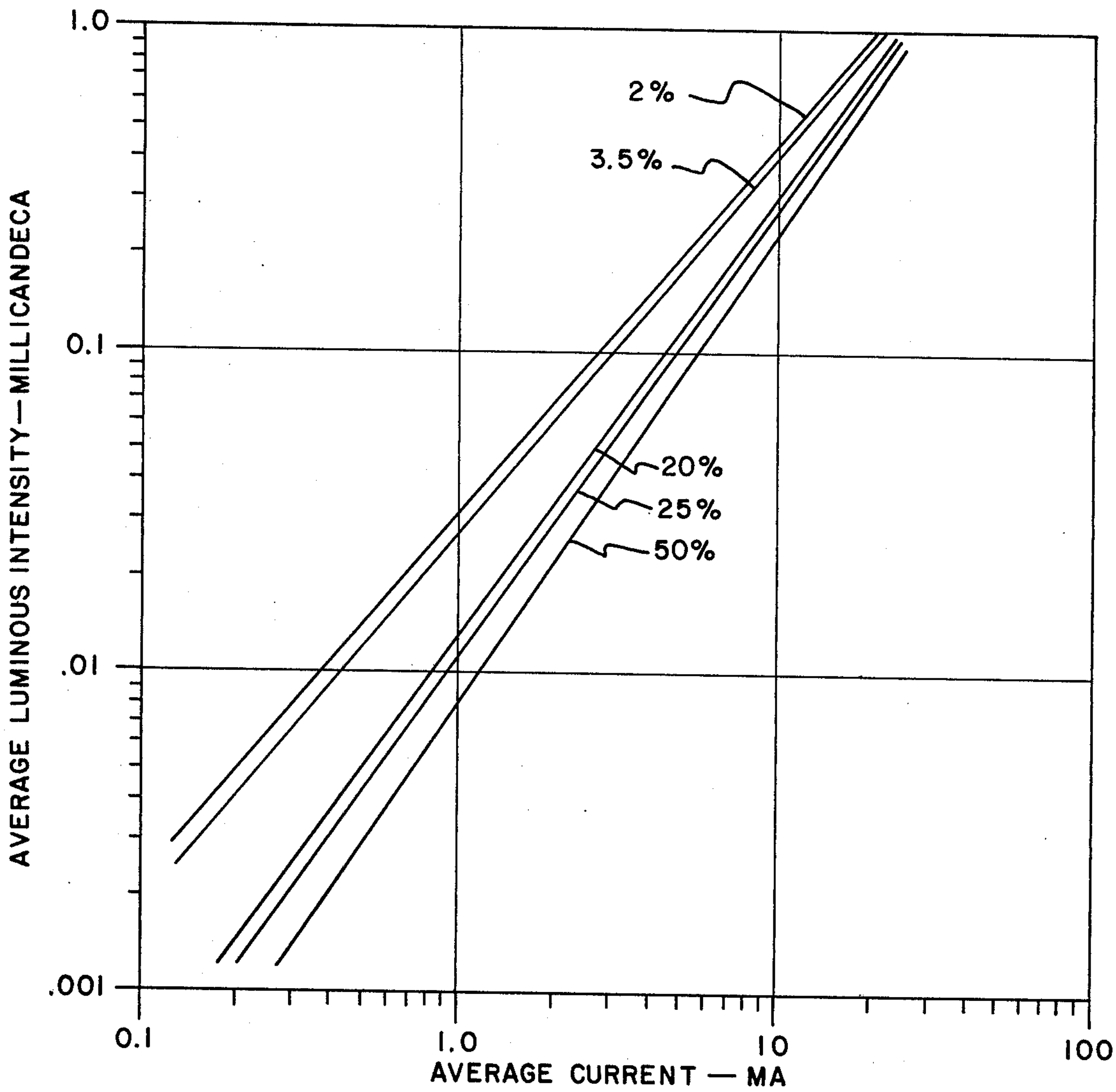
FIG. 10 is a log-log chart showing average luminous intensity as a function of average current through a light emitting diode.

The segments in the digits of digital display 23 are normally light emitting diodes which provide greatly increased brightness as the current level therethrough is increased. Light emitting diode (LED) efficiency is the ratio of light energy produced to electrical energy consumed. LED efficiency increases markedly as duty cycle decreases. Segment scanning therefore produces a much greater power source life and display brightness product than has heretofore been available through known digital displays. A chart is seen in FIG. 10 showing average luminous intensity from an LED as a function of average current through the LED for particular designated duty cycles.

Figure 8:
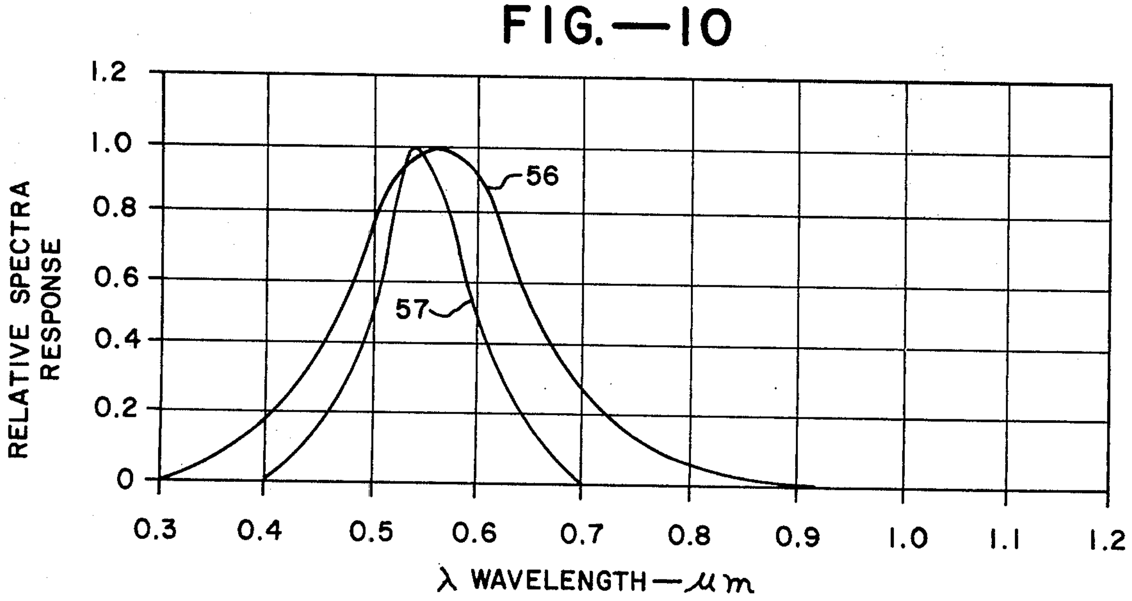
FIG. 8 is a chart showing the relative spectral response of the human eye and a photo diode as a function of light wavelength.

Turning now to FIG. 8 the relative spectra response for a photodiode is shown at 56. The relative spectra response for the human eye is shown at 57. It may be seen that the photodiode encompasses the response of the human eye and is therefore a suitable device for use in sensing light levels for controlling brightness of display 23. FIG. 2 shows continuously variable brightness control 26 which serves two functions. First it provides control for maintaining proper display contrast when changes occur in ambient light level. Second, it provides for evenness of display brightness between segments in the display for any given level of ambient light intensity. The evenness of display intensity between segments is necessitated due to differences attaching during fabrication of LED'S, which produce different light intensity levels for the same exitation current.

A light emitting digital display may be visible in low ambient light levels and completely invisible in higher ambient light levels. The intensity of the display must be increased to afford visibility in the higher ambient light levels. Photodiode $D_5$ is provided and is energized by actuation of finger switch 22. Photodiode $D_5$ is exposed to the same ambient light level to which digital display 23 is exposed. The output from photodiode $D_5$ due to ambient light level is a steady state or relatively low frequency changing output since ambient light does not characteristically vary in level at a high rate. The signal from photodiode $D_5$ due to ambient light level is provided to the input of a low pass filter in the form of integrator 27 in this embodiment. An output is provided from integrator 27 which is connected to one input of operational amplifier $A_4$ which in turn provides an output connected to the sources of FET'S $Q_9$ through $Q_{12}$. As each gate of the FET'S receives a sequential digit scan signal as described above, the respective FET $Q_9$ through $Q_{12}$ is turned on providing an enabling signal to a respective digit $N_1$ through $N_4$. It will be seen however that the magnitude of the enabling signal is a function of the ambient light level proximate to digital display 23. For high light level impinging thereupon and upon diode $D_5$, a higher output signal level will be provided by photodiode $D_5$ to drive the output of integrator 27 to a higher level and consequently the output of operational amplifier $A_4$ to a higher level. Consequently, transistors $Q_5$ through $Q_8$ are turned on harder in their sequence and current through diodes $D_1$ through $D_4$ is therefore higher. The forward voltage drop across diodes $D_1$ through $D_4$ is greater for higher current levels passing therethrough, biasing transistors $Q_1$ through $Q_4$ respectively to a higher level of conduction.

As the segments in one digit are scanned and selected segments emit light, photodiode $D_5$ also senses this pulsed light and produces a pulsed output signal at the same frequency. The output from photodiode $D_5$ is also delivered to differentiator 28 acting as a high pass filter which produces an output which is a function of the brightness of the energized segment and is also connected to an input on operational amplifier $A_4$. The output level from integrator 27 being directly proportional to the ambient level of light, sets a reference level for the output of differentiator 28. When the brightness of a segment causes the output of differentiator 28 to be equal to the reference output level from integrator 27, the drive for that segment at the output of operational amplifier $A_4$ stops increasing. In this fashion segment brightness levels are continuously controlled to a uniform level relative to ambient light level.

A continuous control is also provided for brightness of the digital display 23 to provide substantially the same optical stimulation as ambient light levels change. The former control may be seen to be a function of differentiator 28, and the later control may be seen a function of the integrator 27.

Figure 11:
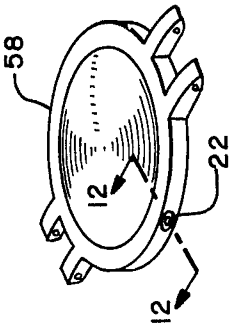
FIG. 11 is an isometric view of a thin section digital wrist watch utilizing the disclosed digital display.
Figure 12:
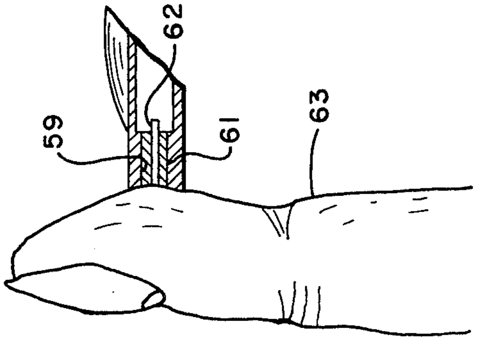
FIG. 12 is a sectional view along the line 12—12 of FIG. 11.

The manner in which finger switch 22 functions will now be described. FIG. 11 shows a wrist watch assembly having a very thin case 58 for enclosing the disclosed digital display. The thickness of watch case 58 has heretofore been limited to a minimum dimension determined by the diameter of mechanical switches which customarily enter the watch case 58 through the periphery thereof. A finger switch 22 is shown which may have an extremely small diametric dimension as is illustrated in FIG. 12. A hole 59 is formed in a radial direction in case 58. A hollow cylindrical insulator 61 is formed to fit within hole 59. A conducting rod 62 is formed to fit on the inside of insulator 61 extending into the interior of watch case 58 and in contact with terminal 38 seen in FIG. 2. Conducting rod 62 is accessible externally of watch case 58. A person may touch the perphery of watch case 58 at the position of switch 22 with a finger shown at 63 in FIG. 12, thereby bridging insulator 61 between conducting rod 62 and case 58. A biological segment, such as finger 63, will have a resistance of approximately one megohm when very clean. As the biological segment becomes soiled or body fluids collect on the surface thereof, the resistance presented by the surface of the biological segment decreases.

Referring to FIG. 12, conducting rod 62 being connected to terminal 38 is thereby connected to the gates of FET'S $Q_{15}$ and $Q_{16}$. Watch case 58 is seen to be connected to terminal 37 on switch 22. Resistor $R_1$ is a high resistance compared to the resistance of biological segment 63, which may be in the order of 1 megohm across accessable terminals 37 and 38. Resistance $R_1$ may be in the order of ten megohms. When finger switch 22 is configured as seen in FIG. 2, a low voltage is present at the gate of $Q_{15}$ providing a conductive path between the source and drain thereof, since $Q_{15}$ is a depletion mode FET. $Q_{16}$ being an enhancement mode FET a low voltage at the gate thereof provides for substantially an open circuit between the source and drain of $Q_{15}$. This is the state of finger switch 22 when terminals 37 and 38 are isolated and switch 22 is in the nonactuated condition. The two inputs to exclusive OR gate $G_1$ are both seen to be low logical states providing a low logical output therefrom connected to scan section 16. In this embodiment a low output from exclusive OR gate $G_1$ is the nonactuating signal for the digital display.

Upon placing a biological segment such as finger 63 across externally accessable terminals 37 and 38, a voltage divider is created with the lesser resistor value being between the externally accessable terminals 37 and 38. In this fashion terminal 38, and therefore the gates of FET'S $Q_{15}$ and $Q_{16}$, is raised to a relatively high potential. Consequently FET $Q_{15}$ is shut off and FET $Q_{16}$ is turned on providing a conductive path between the source and drain thereof. The input to exclusive OR gate $G_1$ connected to the drain of FET $Q_{16}$ is therefore at a logical high state. A logical high and a logical low input to an exclusive OR gate provides a logical high output therefrom. In this embodiment the logical high output actuates the digital display 23 by scanning the segments and providing outputs to predetermined ones of the transistors $Q_a$ through $Q_j$ in segment driver 19 for energizing selected ones of the segments in each digit as it is enabled. It should be understood that a mirror image of the circuit for finger switch 22 shown in FIG. 2 may be utilized if the watch case 58 is placed at the negative potential of power source 18. It should further be recognized that scan section 16 may be tailored to receive either a logical high or a logical low from gate $G_1$ for the actuating signal for display 23, and that the above recited combination is for description of one preferred embodiment only.

Figure 9:
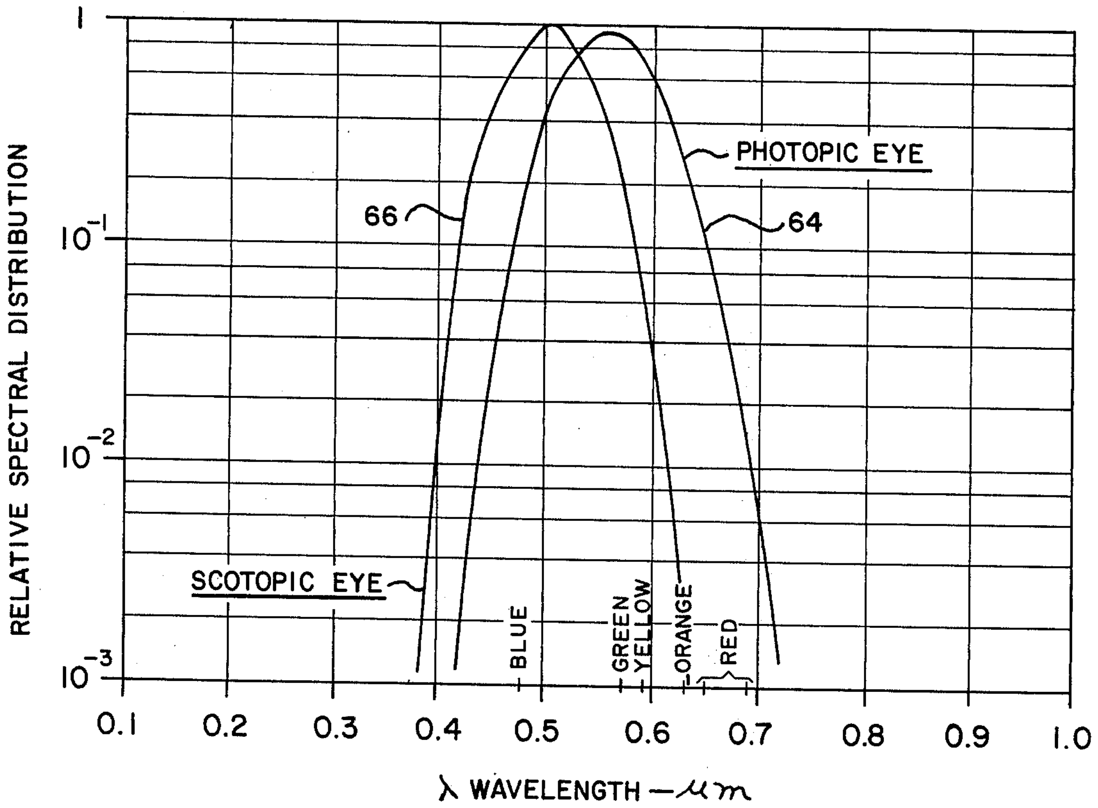
FIG. 9 is a semilogarithmic chart showing the relative visual stimulation for the same energy inputs for standard and dark adapted eye response.

Referring to FIG. 9, a chart is shown on which the ordinate represents relative visual stimulation for eye response as a function of equal energy inputs at various wave lengths of light. Standard eye response is seen on curve 64 and dark adapted eye response is seen on curve 66. Curve 64 may be seen to be much the same as curve 57 in FIG. 8, the distinction being that the scales of FIG. 8 are linear while the ordinate of FIG. 9 is logarithmic. The point in the visible spectrum occupied by blue, green, yellow and red are indicated on the abscissa of FIG. 9. It may be seen that the standard eye response to light having red wave lengths is not the optimum. Light having the wave length associated with the color green is optimum and there are advantages associated with utilization of yellow or blue displays as well. Available light emitting diodes for producing a green display require very short duty cycle to obtain an efficiency providing adequate display brightness. This holds true for devices emitting colors such as yellow and blue as well. It is therefore a necessity that segment scanning be utilized to obtain the necessary short duty cycles for most nonred displays. A further important feature for nonred displays, is utilization of the lithium battery which provides the aforementioned extra measure of terminal voltage and has low internal impedance for maintaining a relatively stable terminal voltage while power is being drawn from the battery.

A digital display assembly has been disclosed with digit scanning at a frequency above the maximum frequency resolution powers of an observer's eye. Segment scanning within the digit scan period allows higher peak current in the segments for a shorter duty cycle resulting in a lower average current. Uniform brightness is provided between individual segments by means of a continuously variable brightness control which also provides for uniform contrast relative to ambient light levels. Peak segment current is diminished for low ambient light levels thus improving power source life. Nonred displays are made possible by the short duty cycle in the high terminal voltage provided by the lithium battery. A display actuating switch which may assume minimal dimensions is provided to assist in miniaturizing the assembly outline. A set switch utilizing an external magnetic field is provided, which sets the digital display while the display command switch is actuated. A capacitor is connected in conjunction with the power source for maintaining the circuit in operating condition during temporary disconnection of the power source.

What is claimed is:

1. A light emitting digital display circuit energized by a source of electric power, comprising

- a plurality of light emitting devices for providing discrete light emitting segments responsive to electric current passing therethrough
- a digit array formed by relative physical positioning of said discrete light emitting segments so that a plurality of light emitting alphabetical and numerical symbols may be formed by predetermined combinations of selected ones of said light emitting segments means operating at a first frequency for enabling said digit array for a first period determined by said first frequency, means for scanning said light emitting segments at a second frequency for coupling each of said selected ones of said segments in sequence to the source of electric power for a second period determined by said second frequency within said first period, means for controlling the luminous intensity of light emitted by each of said selected ones of said segments to substantially the same level relative to ambient light, a switch for selectively providing an actuating signal for said digit array, whereby said digit array produces an illuminated symbol having uniform light intensity from all segments in the symbol when said actuating signal is provided while said digit array is enabled.

2. A light emitting digital display as in claim 1 wherein said switch comprises first and second externally accessible electrodes, said first electrode being coupled to the source of electric power, and an electric switch having an input connected to said second externally accessible electrode and having an output, so that when the resistance of a biological segment is imposed between said first and second electrodes said actuating signal is provided.

3. A light emitting digital display as in claim 2 wherein said electronic switch comprises first and second complementary field effect transistors with the source of the first and the drain of the second connected to said output, the drain of the first and the source of the second coupled to different electrical potentials provided by the source of electrical power, and the gates of both the first and second field effect transistors connected to said input.

4. A light emitting digital display as in claim 1 wherein said plurality of light emitting devices are light emitting diodes.

5. A light emitting digital display as in claim 4 wherein said light emitting diodes emit green light.

6. A light emitting display as in claim 1 together with a plurality of additional digit arrays said digit array and additional digit arrays being enabled in sequence for said first period by said means operating at a first frequency, means for continuously controlling the brightness of said digit array and additional digit arrays to provide substantially the same optical stimulation as ambient light level changes.

7. A light emitting display as in claim 1 wherein said first frequency is above the frequency resolution of an observer's eye and said second frequency is a higher multiple of said first frequency depending upon the number of segments in said digit array.

8. A light emitting display as in claim 7 wherein said digit array is a first digit array together with second, third and fourth digit arrays, said digit arrays being enabled in sequence for said first period by said means operating at a first frequency, said first digit array having nine segments, said second digit array having eight segments, said third and fourth digit arrays having seven segments each, and a colon having one segment located between said second and third digit arrays whereby said second period is one eighth of said first period so that eight segments are scanned while each digit array is enabled and each segment has a one 30second duty cycle.

9. A light emitting digital display circuit as in claim 1 wherein the source of electric power has terminals for coupling to the circuit, together with a capacitor connected across the terminals for storing a charge provided by the source, so that when said selected ones of said segments pass electric current the voltage at the terminals is sustained by the charge on said capacitor, and the circuit remains energized during brief periods of disconnection from the source of electric power.

10. A light emitting digital display circuit as in claim 1 wherein the means operating at a first frequency includes a current mirror connected to said digit array for controlling the magnitude of the electric current passing through said selected ones of said segments to a preadjusted level, together with means connected to said current mirror for continuously controlling the brightness of said digit array to provide substantially the same optical stimulation for variations in ambient light levels.

11. A light emitting digital display as in claim 10 wherein said means for controlling the luminous intensity of light emitted by selected ones of said segments includes a photo sensitive device providing a control output signal responsive to light input, and a high pass filter for receiving said control output signal and providing a high frequency control signal coupled to said current mirror and responsive to light levels at said second frequency for changing the electric current level therethrough, and wherein said means for continuously controlling the brightness of said digit array includes a low pass filter for receiving said control output signal and providing a low frequency control signal coupled to said current mirror and responsive to ambient light levels for changing the electric current level therethrough from said preadjusted level.

12. A light emitting digital display as in claim 1 whrein said means for scanning includes a clock providing a predetermined reference frequency, a first divider circuit for receiving said reference frequency and providing a plurality of segment drive signals in sequence having said second period dwell time, a plurality of segment driver transistors having inputs connected one each to ones of said plurality of segment drive signals and outputs connected to one of said plurality of light emitting devices, and wherein said means operation at a first frequency includes a second divider circuit coupled to said reference frequency and providing a digit drive signal having said first period dwell time, and a current mirror having an input coupled to said digit drive signal and an output connected to said plurality of light emitting devices.

13. A light emitting digital display circuit as in claim 1 wherein said plurality of light emitting alphabetical and numerical symbols are formed in a predetermined sequence by said digit array, together with means for stepping said digit array through said predetermined sequence at a rapid rate, said last named means producing a set signal when said switch is actuated so that a predetermined symbol may be formed by said digit array.

14. A light emitting digital display circuit as in claim 13 wherein said means for stepping includes a Hall effect device for producing said set signal when placed in a magnetic field.

15. A light emitting digital display comprising a clock for providing a stable reference frequency output a segment scan circuit coupled to said reference frequency output having a segment scan frequency and producing a plurality of sequential segment control signals in each segment scan cycle, each segment control signal having a first dwell time, a digit scan circuit coupled to said references frequency output having a digit scan frequency above the frequency response of the eye and producing a plurality of sequential digit control signals in each digit scan cycle, each digit control signal having a second dwell time at least as long as the period of said segment scan frequency, a plurality of digit arrays, a plurality of segments in each of said digit arrays arranged in relative position to represent predetermined symbols when electric current is passed through selected segments causing said segments to emit light, a plurality of means for enabling said digit arrays having inputs coupled to ones of said plurality of sequential digit control signals and outputs connected to said plurality of segments, said last named means being adjusted to pass a predetermined level of electric current, a plurality of segment drivers having inputs coupled to ones of said plurality of sequential segment control signals and outputs connected to ones of said plurality of segments in each of said digit arrays, a pair of exposed electrodes, a switch responsive to placement of the resistance of a biological segment across said pair of electrodes for actuating said segment scan circuit, whereby said selected segments have a short duty cycle equivalent to said first dwell time during each digit scan cycle so that higher electric current levels may be passed through said segments for producing higher brightness levels there from while maintaining average current at or below levels for longer duty cycles.

16. A light emitting digital display as in claim 15 together with a photo sensitive device providing a light intensity control signal responsive to light input, a high pass filter for receiving said light intensity control signal and providing a high frequency control signal coupled to said means for enabling said digit arrays and responsive to light levels at said segment scan frequency for controlling the electric current level therethrough to provide uniform brightness of light emitted from selected segments, and a low pass filter for receiving said light intensity control signal and providing a low frequency control signal coupled to said means for enabling said digit arrays and responsive to ambient light levels for controlling the electric current level therethrough relative to said predetermined level so that uniform brightness is provided by light emitted from digit arrays for differing ambient light levels.

17. A light emitting digital display as in claim 15 wherein said predetermined symbols are presented in timed sequence related to said reference frequency, together with means for setting any desired symbol to initially appear at said digit array, said means for setting operating only when said switch is actuated.

18. A light emitting display as in claim 15 together with power terminals coupled to said segment scan circuit adapted to receive power from an electrical power source and a capacitor connected across said power terminals whereby power source terminal voltage is sustained during passing of electric current through said selected segment by the charge on said capacitor and electric current and segment brightness is therefore more uniform.

19. A light emitting digital display circuit comprising a clock for providing a reference frequency, a segment scan circuit for providing a repeating segment scan cycle output when enabled, said scan cycle output being related to said reference frequency, said segment scan cycle having a plurality of sequential segment signals therein, a plurality of light emitting segments for receiving said segment signals within a segment scan cycle, a plurality of digit arrays formed by said segments for providing predetermined symbols according to selected segments being energized therein, a digit scan circuit for providing a repeating digit scan cycle output related to said reference frequency, said digit scan cycle having a plurality of sequential digit signals therein, said segment scan cycle having a period equivalent to the dwell time of one of said sequential digit signals, a switch for enabling said scan circuit, a plurality of segment drivers for receiving ones of said plurality of sequential segment signals and for passing current to a connected segment, a plurality of digit drivers for receiving ones of said plurality of sequential digit signals, thereby sequentially enabling ones of said plurality of digit arrays, whereby said segments are scanned in each digit array during the dwell time of each of said sequential digit signals, and segment duty cycle is reduced to the ratio of said sequential segment signal dwell time to said digit scan cycle period so that high peak current may be passed through selected segments to obtain a high brightness level while average current therethrough is minimized.

20. A light emitting digital display circuit as in claim 19 together with a photo sensitive device for providing a control signal output responsive to light input, a high pass filter for receiving said control signal output and producing a segment control signal resulting from light input to said photo sensitive device at the frequency of said sequential segment signals said digit drivers having a preset current level said segment control signal being coupled to said digit drivers for continously varying the preset current level therethrough and through said selected segments to obtain uniform brightness between selected segments.

21. A light emitting digital display as in claim 20 together with a low pass filter for receiving said control signal output and producing a digit control signal resulting from ambient light input to said photo sensitive device said digit control signal being coupled to said digit drivers for continuously varying the preset current level therethrough and through said selected segments to obtain a uniform display contrast for different ambient light levels.

22. A method of presenting a light emitting digital display comprising the steps of scanning a number of digits, scanning a number of segments in each digit for each digit scan, presetting a current level for passing through each segment, whereby only one segment passes current at a time, whereby a high current level may be passed through each segment for a short time period to obtain high luminous intensity therefrom while using low average current, sensing the ambient light level, and controlling the preset current level to vary relative to the ambient light level, thereby providing an adjusted current level to obtain desired display contrast continuously as ambient light level changes.

23. A method as in claim 22 together with the step of sensing the light level emitted by each segment, controlling the adjusted current level to vary for obtaining uniform brightness from all segments.

* * * * *